(No Model.)
H. P. BROWN.
BOLT LOCK.
No. 522,287. Patented July 3, 1894.
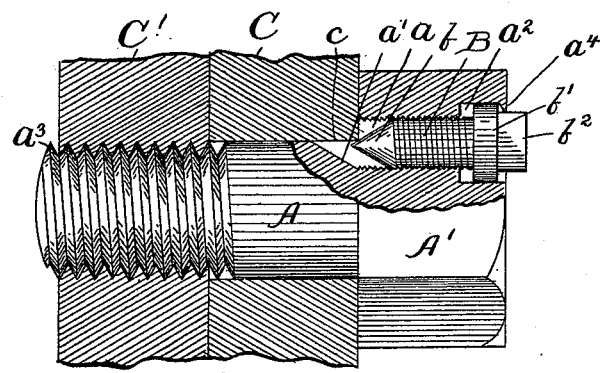
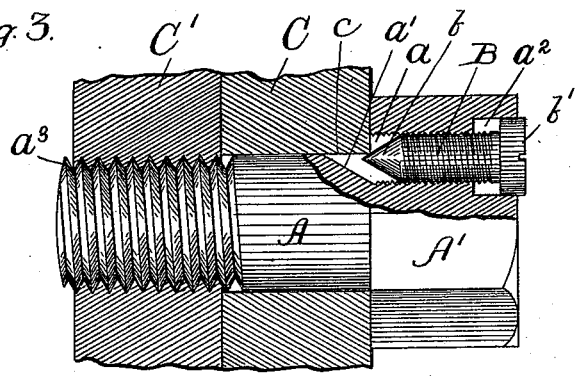
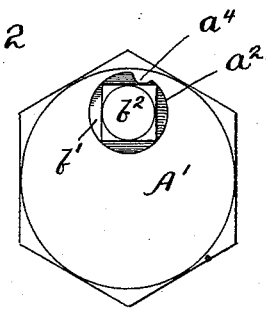
Witnesses:
Geo. E. Curtis
A. M. Munday
Inventor:
HAROLD P. BROWN
By Munday, Evarts & Adcock.
His Attorneys.

UNITED STATES PATENT OFFICE.

HAROLD P. BROWN, OF NEW YORK, N. Y.

BOLT-LOCK.

SPECIFICATION forming part of Letters Patent No. 522,287, dated July 3, 1894.

Application filed October 20, 1893. Serial No. 488,700. (No model.)

*To all whom it may concern:*

Be it known that I, HAROLD P. BROWN, a citizen of the United States, residing in New York, in the county of New York and State of New York, have invented a new and useful Improvement in Bolt-Locks, of which the following is a specification.

My invention relates to set screws for locking bolts from turning.

My invention consists, in connection with a bolt having a hole extending through its head parallel to the axis of the bolt, and located, preferably, so that its center should be on or slightly within the periphery of the bolt, of a set screw having a hardened taper point adapted to fit against and embed itself in the inner peripheral wall of the metal piece through which the bolt is inserted. The set screw thus serves to lock the bolt securely from turning and also to take up the slack in the fit between the bolt and the metal piece through which it passes.

In the accompanying drawings which form a part of this specification, I have shown a device embodying my invention.

Figure 1 is a sectional view. Fig. 2 is an end view and Fig. 3 a sectional view showing a modification.

In said drawings A represents the bolt, A' its head furnished with a threaded hole $a$ extending through it preferably about parallel to its axis, and located so that the center of the hole will fall slightly within the peripheral surface of the bolt A. The hole $a$ should be bored with a taper pointed drill, having an angle corresponding to the angle of the point $b$ of the set screw B, the same being preferably a sixty degree angle. The hole $a$ should extend but little farther than the position to be occupied by the set screw point; the hole $a$ will thus have a semi-conical termination $a'$ in the peripheral surface of the bolt, as is clearly indicated in the drawings. The head $b'$ of the set screw may project beyond the end surface of the bolt head, but preferably fits in the countersink $a^2$ formed in the bolt head to receive it.

C C' represent in the drawings pieces of metal through which the bolt A passes, the part C' being screw threaded to receive the screw threads $a^3$ of the bolt. It will thus be seen that the point $b$ of the set screw projects between the periphery of the bolt and the wall $c$ of the hole in which the bolt is inserted. The bolt A is first screwed or pulled up in place in the metal pieces C C' through which it is inserted; and the set screw is then advanced into position in the threaded hole $a$. As the set screw is screwed home it wedges the bolt A over, takes up the slack in the fit and embeds itself in the metal C through which the bolt A passes. The pointed screw B can easily be set so tight that the bolt cannot possibly be moved. The head $b'$ of the set screw is preferably formed with a squared portion $b^2$ and a circular portion $b'$. The circular part $b'$ of the head fitting the recess $a^2$ serves to exclude dirt and wet from the threads of the set screw, while the squared portion is adapted to receive a wrench. To lock the set screw from turning the surrounding wall of the recess may be upset, thus forming one or more projections $a^4$ that will engage the corners of the squared head $b^2$, and thus prevent the set screw turning. The projections $a^4$ will not prevent the removal of the screw with a wrench as the corners of the head $b^2$ will scrape them off.

In Fig. 3 the head of the screw is slotted to receive a screw driver instead of being squared to receive a wrench.

I claim—

1. The combination with a threaded bolt having a head furnished with a threaded hole extending through the same and terminating at the peripheral surface of the bolt, of a hardened taper pointed set screw, the point of said set screw projecting through the head of the bolt and fitting between the periphery of the bolt and the inner wall of the metal piece through which the bolt is inserted, substantially as specified.

2. The combination of bolt A, having head A', furnished with threaded hole $a$ extending parallel to the axis of the bolt and located so that its center is on or slightly within the periphery of the bolt, of metal piece C having a hole through which said bolt is inserted, and set screw B having a hardened taper point $b$ projecting between the periphery of said bolt and the wall of the hole in which said bolt fits, substantially as specified.

3. The combination with bolt A having recess $a^2$ of set screw B having head $b'$ furnished with squared portion $b^2$ fitting in said recess, the wall of said recess being upset, forming a locking projection $a^4$ for the set screw, substantially as specified.

HAROLD P. BROWN.

Witnesses:
LEW. E. CURTIS,
EMMA HACK.